(12) United States Patent
Yan (10) Patent No.: US 7,659,928 B2
(45) Date of Patent: Feb. 9, 2010

(54) APPARATUS AND METHOD FOR PROVIDING ANTI-ECLIPSE OPERATION FOR IMAGING SENSORS

(75) Inventor: Hai Yan, Fontana, CA (US)

(73) Assignee: Aptina Imaging Corporation (KY)

( * ) Notice: Subject to any disclaimer, the term of this patent is extended or adjusted under 35 U.S.C. 154(b) by 761 days.

(21) Appl. No.: 11/110,874

(22) Filed: Apr. 21, 2005

(65) Prior Publication Data

US 2006/0238634 A1 Oct. 26, 2006

(51) Int. Cl.
H04N 5/217 (2006.01)
H04N 3/14 (2006.01)
H04N 5/335 (2006.01)
H01L 27/00 (2006.01)

(52) U.S. Cl. ...................... 348/241; 348/307; 250/208.1

(58) Field of Classification Search ................. 348/241, 348/243, 245–247, 222.1, 230.1, 307–308
See application file for complete search history.

(56) References Cited

U.S. PATENT DOCUMENTS 6,140,630 A 10/2000 Rhodes
6,204,524 B1 3/2001 Rhodes
6,310,366 B1 10/2001 Rhodes et al.
6,326,652 B1 12/2001 Rhodes
6,333,205 B1 12/2001 Rhodes
6,376,868 B1 4/2002 Rhodes
2004/0036783 A1* 2/2004 Barna ......................... 348/300
2004/0119853 A1* 6/2004 Kokubun et al. ............. 348/241
2005/0237400 A1* 10/2005 Blerkom et al. ............. 348/241
2006/0044414 A1* 3/2006 Lee et al. .................. 348/230.1

* cited by examiner

Primary Examiner—Kelly L Jerabek
(74) Attorney, Agent, or Firm—Dickstein Shapiro LLP (57) ABSTRACT

An anti-eclipse circuit of an image pixel includes an output line for receiving a reset output signal from a pixel and a circuit coupled to the output line for detecting when a pixel reset voltage at a pixel output is below a predetermined level, and, in response, for increasing a reset voltage at the pixel output to a value above the predetermined level. The detecting and increasing circuit comprises a charge amplifier circuit for receiving the reset output signal at the output line and a voltage generating circuit coupled to the output line responsive to the output of the charge amplifier circuit.

13 Claims, 5 Drawing Sheets

APPARATUS AND METHOD FOR PROVIDING ANTI-ECLIPSE OPERATION FOR IMAGING SENSORS

FIELD OF INVENTION

The present invention relates generally to pixel architectures for semiconductor imagers. More specifically, the present invention relates to an anti-eclipse circuit for image sensors.

BACKGROUND OF THE INVENTION

A CMOS imager circuit includes a focal plane array of pixel cells, each one of the cells including a photosensor, for example, a photogate, photoconductor or a photodiode for accumulating photo-generated charge in the specified portion of the substrate. Each pixel cell has a charge storage region, formed on or in the substrate, which is connected to the gate of an output transistor that is part of a readout circuit. The charge storage region may be constructed as a floating diffusion region. In some imager circuits, each pixel may include at least one electronic device such as a transistor for transferring charge from the photosensor to the storage region and one device, also typically a transistor, for resetting the storage region to a predetermined charge level prior to charge transference.

In a CMOS imager, the active elements of a pixel cell perform the functions of: (1) photon to charge conversion; (2) accumulation of image charge; (3) resetting the storage region to a known state; (4) transfer of charge to the storage region; (5) selection of a pixel for readout; and (6) output and amplification of a signal representing pixel charge. Photo charge may be amplified when it moves from the initial charge accumulation region to the storage region. The charge at the storage region is typically converted to a pixel output voltage by a source follower output transistor.

CMOS imagers of the type discussed above are generally known as discussed, for example, in U.S. Pat. No. 6,140,630, U.S. Pat. No. 6,376,868, U.S. Pat. No. 6,310,366, U.S. Pat. No. 6,326,652, U.S. Pat. No. 6,204,524 and U.S. Pat. No. 6,333,205, assigned to Micron Technology, Inc., which are hereby incorporated by reference in their entirety.

Figure 1:
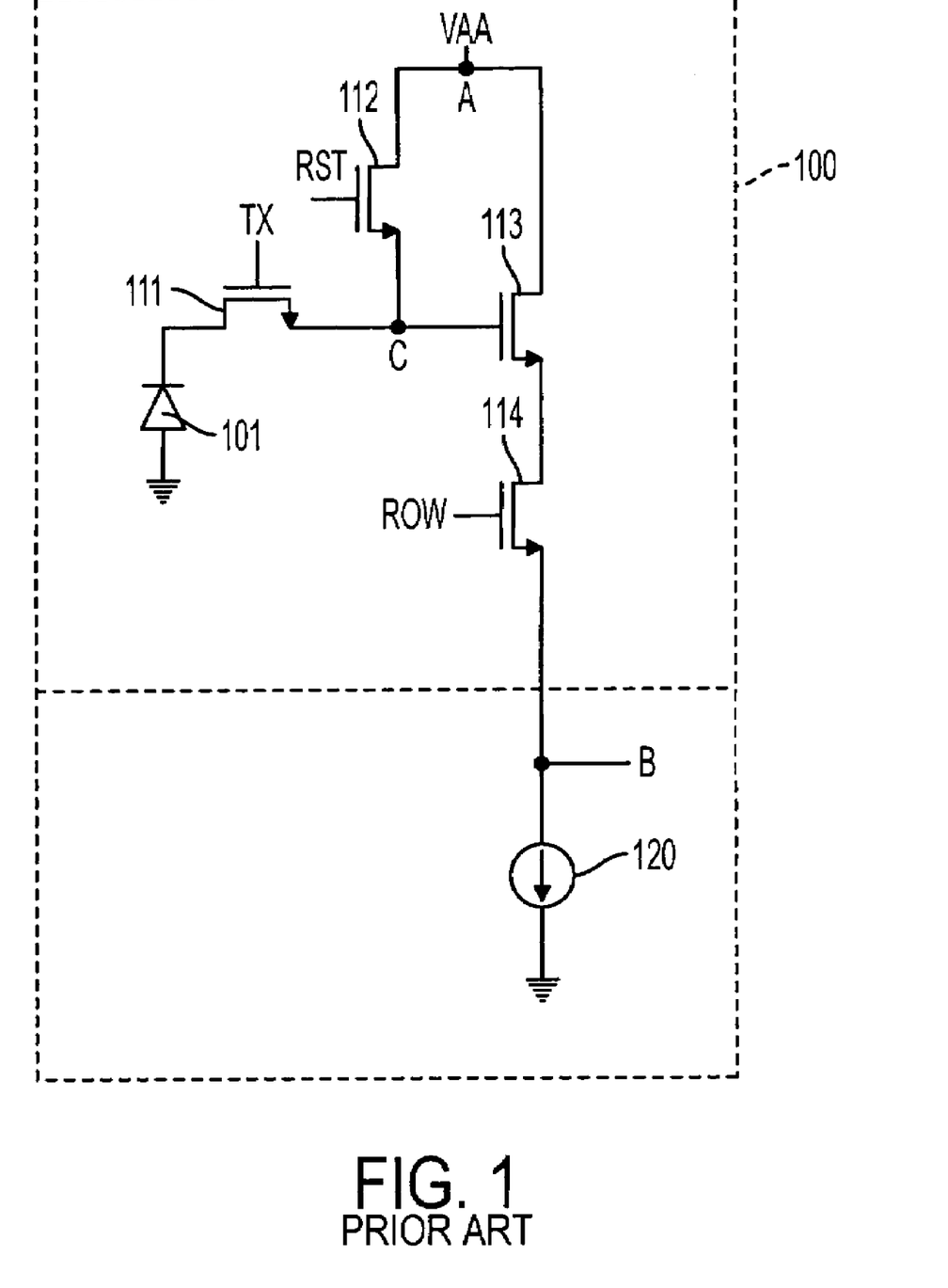
FIG. 1 illustrates a conventional pixel and an associated load circuit.

FIG. 1 is an illustration of a conventional four transistor (4T) pixel 100 and an associated load circuit 120 (shown as a current source). The pixel 100 includes a light sensitive element 101, shown as a photodiode, a floating diffusion region C, and four transistors: a transfer transistor 111, a reset transistor 112, a first source follower transistor 113, and a row select transistor 114. The pixel 100 accepts a TX control signal for controlling the conductivity of the transfer transistor 111, a RST control signal for controlling the conductivity of the reset transistor 112, and a ROW control signal for controlling the conductivity of the row select transistor 114. The charge at the floating diffusion region C controls the conductivity of the first source follower transistor 113. The output of the source follow transistor 113 is presented to the load circuit 120 through the row select transistor 114, which outputs a pixel signal at node B, when the row select transistor 114 is conducting.

The states of the transfer and reset transistors 111, 112 determine whether the floating diffusion region C is coupled to the light sensitive element 101 for receiving a photo generated charge as generated by the light sensitive element 101 during a charge integration period, or a source of pixel power VAA from node A during a reset period.

The pixel 100 is operated as follows. The ROW control signal is asserted to cause the row select transistor 114 to conduct. At the same time, the RST control signal is asserted while the TX control signal is not asserted. This couples the floating diffusion region C to the pixel power VAA at node A, and resets the voltage at node C to the pixel power VAA. The pixel 100 outputs a reset signal Vrst to the load circuit 120. Node B is coupled between the row select transistor 114 and the load circuit 120 and serves as an input to a sample and hold circuit that samples and holds the pixel reset voltage Vrst.

After the reset signal Vrst has been output, the RST control signal is deasserted. The light sensitive element 101 is exposed to incident light and accumulates charges on the level of the incident light during a charge integration period. After the charge integration period, the TX control signal is asserted. This couples the floating diffusion region C to the light sensitive element 101. Charge flows through the transfer transistor 111 and diminishes the voltage at the floating diffusion region C. The pixel 100 outputs a photo signal Vsig to the load circuit 120 which appears at node B and is sampled by the sample and hold circuit. The reset and photo signals Vrst, Vsig are different components of the overall pixel output (i.e., Voutput=Vrst−Vsig).

A pixel 100 is susceptible to a type of distortion known as eclipsing. Eclipsing refers to the distortion arising when a pixel outputs a pixel signal corresponding to a dark pixel even though bright light is incident upon the pixel. Eclipsing can occur when a pixel is exposed to bright light, as the light sensitive element 101 can produce a large quantity of photo-generated charge. While the pixel 100 is outputting the reset signal Vrst, a portion of the photogenerated charge produced by the light sensitive element 101 during an ongoing integration period may spill over the transfer transistor 111 into the floating diffusion node C. This diminishes the reset voltage at the floating diffusion node and can causes the pixel 100 to output an incorrect (i.e., diminished voltage) reset signal Vrst. This, in turn, can cause the reset and photo signals Vrst, Vsig to be nearly the same voltage. For example, the photo and reset signals Vrst, Vsig may each be approximately 0 volts. The pixel output (Vrst−Vsig) can therefore become approximately 0 volts, which corresponds to an output voltage normally associated with a dark pixel.

An anti-eclipse circuit can be used to minimize the effect of eclipsing. For example, since during an eclipse a pixel's reset voltage will tend to drop towards zero volts, an anti-eclipse circuit can monitor the voltage level of the reset signal. If the voltage level drops below a threshold voltage, the anti-eclipse circuit can assume that the eclipsing may occur (or is occurring) and then correct the voltage level of the reset signal by pulling the reset level up to a correction voltage, thereby minimizing the eclipse effect.

Figure 2:
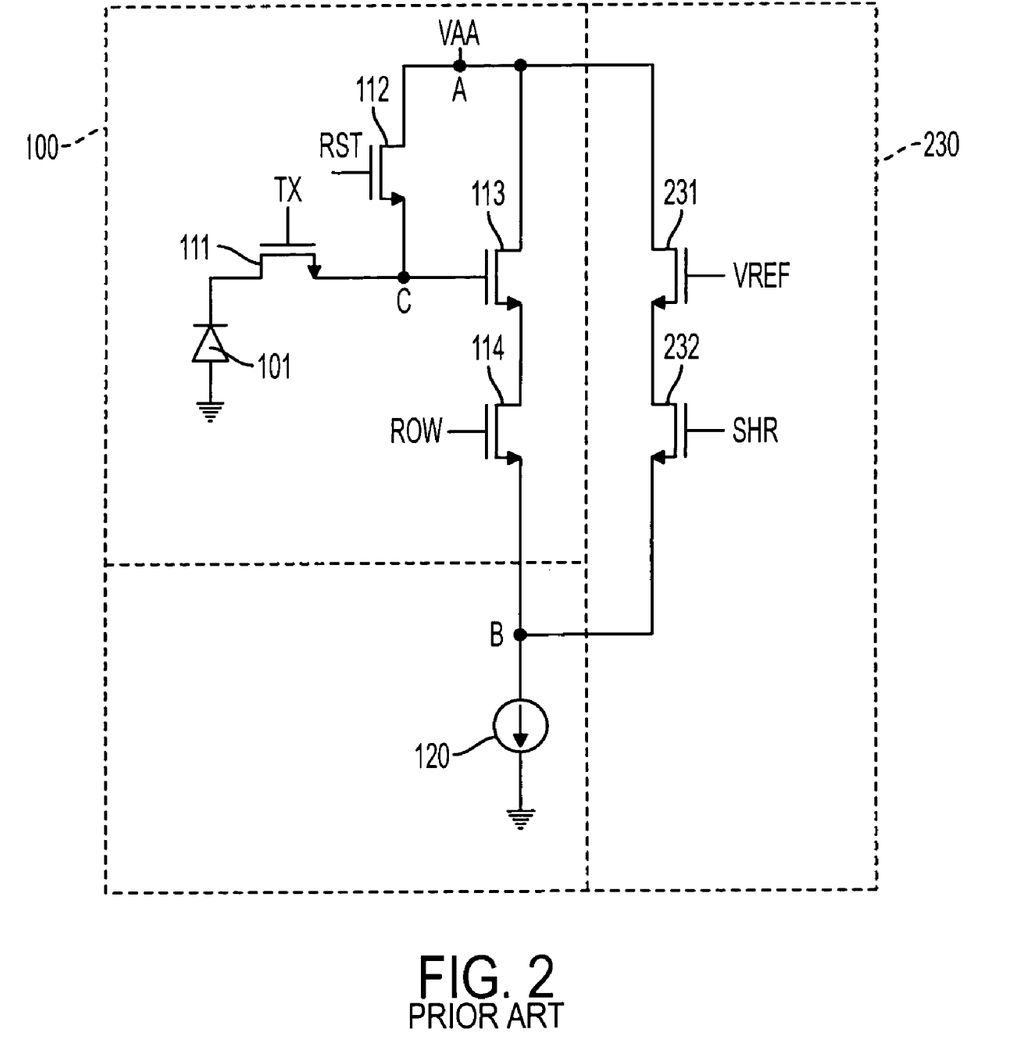
FIG. 2 illustrates a conventional pixel, an anti-eclipse circuit, and a load circuit.

FIG. 2 is an illustration of the pixel 100, its load circuit 120, and a proposed anti-eclipse circuit 230 for overcoming the above-described eclipse problem. The anti-eclipse circuit 230 comprises a second source follower transistor 231 coupled in series with a switching transistor 232. The output of the switching transistor 232 is coupled in parallel with the output of the pixel 100 to the input of the load circuit 120 (i.e., to node B). The second source follower transistor 231 has one source/drain coupled to the pixel power VAA and another source/drain terminal coupled to the switching transistor 232. The second source follower transistor 231 is biased with a VREF control signal. The conductivity of the switching transistor 232 is controlled by a SHR (sample and hold reset) control signal. The VREF voltage level is set so that if the voltage on the floating diffusion region C degrades while the reset signal Vrst is being output, the second source follower transistor 231 conducts and pulls the voltage at node B up to VREF minus the threshold voltage of the second source follower transistor 231. One limitation of the anti-eclipse circuit 230 relates to subthreshold conduction current that flows through the second source follower transistor 231. Even when anti-eclipsing is not needed, the subthreshold conduction current associated with the second source follower transistor 231 is output to node B as noise in the reset signal Vrst, which is undesirable.

Accordingly, there is a need and desire for an improved anti-eclipse circuit for imagers.

BRIEF SUMMARY OF THE INVENTION

Exemplary embodiments of the invention provide an anti-eclipse circuit, and method of forming the same, comprising an output line for receiving a reset output signal from a pixel and a circuit coupled to the output line for detecting when a pixel reset voltage at a pixel output is below a predetermined level, and, in response, for increasing a reset voltage at the pixel output to a value above the predetermined level. The detecting and increasing circuit comprises a charge amplifier circuit for receiving the reset output signal at the output line and a voltage generating circuit coupled to the output line responsive to the output of the charge amplifier circuit. The anti-eclipse circuit can also be used for other signals being sampled in the imager.

BRIEF DESCRIPTION OF THE DRAWINGS

The foregoing and other advantages and features of the invention will become more apparent from the detailed description of exemplary embodiments provided below with reference to the accompanying drawings in which.

DETAILED DESCRIPTION OF THE INVENTION

In the following detailed description, reference is made to the accompanying drawings, which are a part of the specification, and in which is shown by way of illustration various embodiments whereby the invention may be practiced. These embodiments are described in sufficient detail to enable those skilled in the art to make and use the invention. It is to be understood that other embodiments may be utilized, and that structural, logical, and electrical changes, as well as changes in the materials used, may be made without departing from the spirit and scope of the present invention. Additionally, certain processing steps are described and a particular order of processing steps is disclosed; however, the sequence of steps is not limited to that set forth herein and may be changed as is known in the art, with the exception of steps or acts necessarily occurring in a certain order.

The term "pixel" refers to a photo-element unit cell containing a photo-conversion device or photosensor, for example, a photogate, photoconductor or a photodiode and transistors for processing an electrical signal from electromagnetic radiation sensed by the photo-conversion device. The embodiments of pixels discussed herein are illustrated and described as employing four transistor (4T) pixel circuits which use a transfer transistor to gate charge from a photosensor to a storage region for the sake of example only. It should be understood that the invention may be used with other pixel arrangements having more or less than four transistors and in arrangements which do not use a transfer transistor. Although capacitances are shown as discreet capacitors, the can also be formed as parasitic capacitances inherent in signal lines or fabrication techniques.

In addition, although the invention is described below with reference to a CMOS imager, the invention has applicability to any solid state imaging device having a storage node which is reset and then has charges transferred to it. The following detailed description is, therefore, not to be taken in a limiting sense, and the scope of the present invention is defined only by the appended claims.

Figure 3:
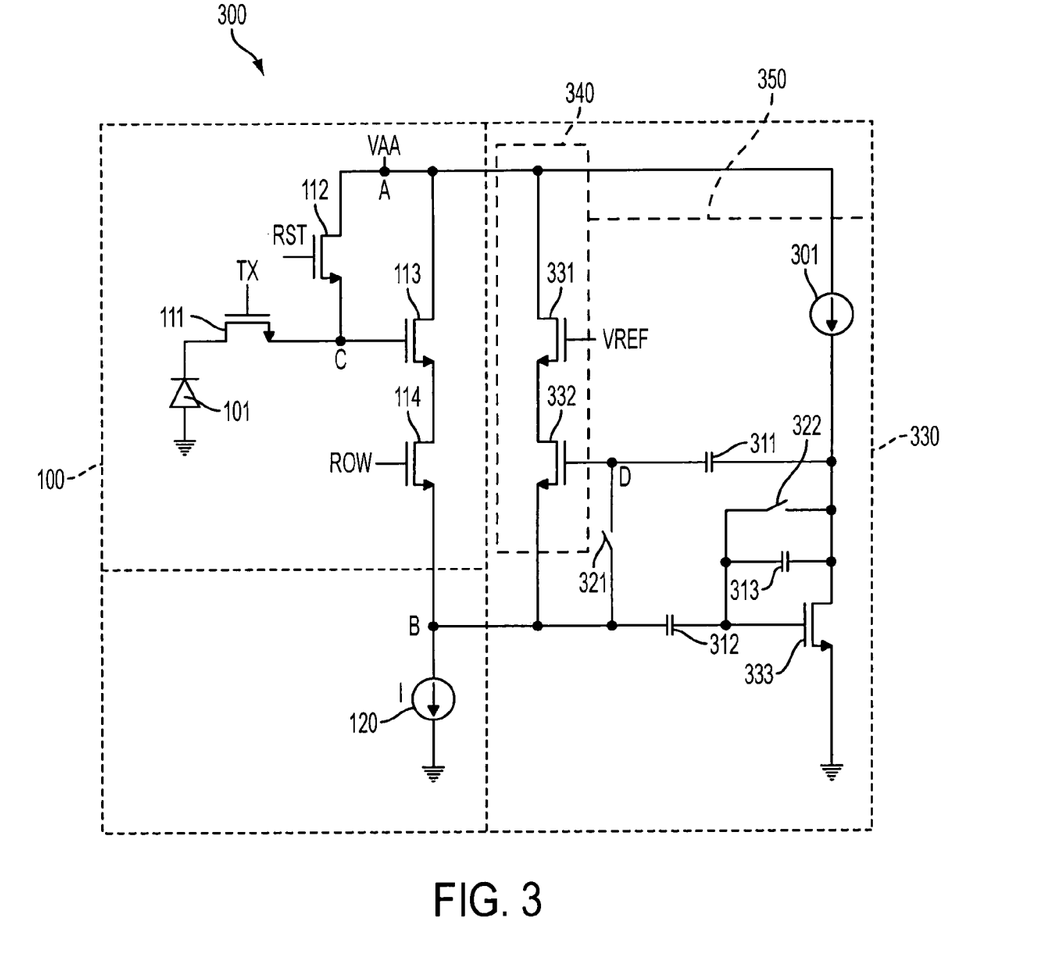
FIG. 3 illustrates a conventional pixel, an anti-eclipse circuit, and a load circuit. This is constructed in accordance with an exemplary embodiment of the invention.

FIG. 3 is an illustration of an imaging device 300 including an anti-eclipse circuit 330 constructed in accordance with one exemplary embodiment of the invention. The anti-eclipse circuit 330 of the invention includes a voltage generating circuit 340 and a charge amplifier circuit 350. A conventional pixel 100, e.g., the 4T pixel 100 of FIG. 1, and a conventional load circuit 120 (shown as a current source) are also illustrated in FIG. 3 and are connected to the anti-eclipse circuit 330 as is described below.

The voltage generating circuit 340 comprises a clamping transistor 331 which defines a minimum reset voltage level. Clamping transistor 331 is coupled between pixel power VAA at node A and an activation transistor 332. The source of activation transistor 332 is coupled to pixel output node B. The gate of activation transistor 332 is electrically connected to node D of the charge amplifier circuit 350 (described below).

The charge amplifier circuit 350 comprises a charge amplification transistor 333 with a source electrically connected to a current source 301 and a drain electrically connected to a ground potential. A first capacitor 312 is coupled between the pixel output node B and the gate of charge amplification transistor 333. A second capacitor 313 is coupled between the gate of charge amplification transistor 333 and current source 301 and the source of charge amplification transistor 333. A third capacitor 311 is coupled between node D and the connection of the current source 301. A first switch 321 is connected between node D and pixel output node B. A second switch 322 is connected across capacitor 313 between current source 301 and the gate of charge amplification transistor 333.

In operation, before the pixel 100 is accessed by a readout circuit (not shown), the switches 321 and 322 of charge amplifier circuit 350 are closed (or turned on). Because the gate and the source of activation transistor 332 are shorted by the first switch 321, the activation transistor 332 is turned off. The gate and the drain of charge amplification transistor 333 is shorted by the second switch 322, thus the voltage at the drain of charge amplification transistor 333 is settled into a voltage level approximately equal to the threshold voltage of charge amplification transistor 333. After reset transistor 112 is turned off, then switches 321 and 322 are opened (or turned off). Next, the signal at pixel output node B is sampled by a sample and hold circuit (not shown). The switches 321 and 322 are closed again to turn off activation transistor 332 and set the voltage at the drain of charge amplification transistor 333 back to a voltage level approximately equal to the threshold voltage of charge amplification transistor 333.

With this circuit, activation transistor 332 is only turned on when there is a significant eclipse effect in the pixel 100. A slight voltage level fluctuation at pixel output node B due to charge injection or voltage coupling from other nodes will not turn on activation transistor 332. Thus, normal pixel readout will not be affected. Because of this, the voltage level VREF can be set to a desirable value to minimize the eclipse effect without introducing additional fixed pattern noise, which is an improvement over the conventional anti-eclipse circuit of FIG. 2.

Figure 4:
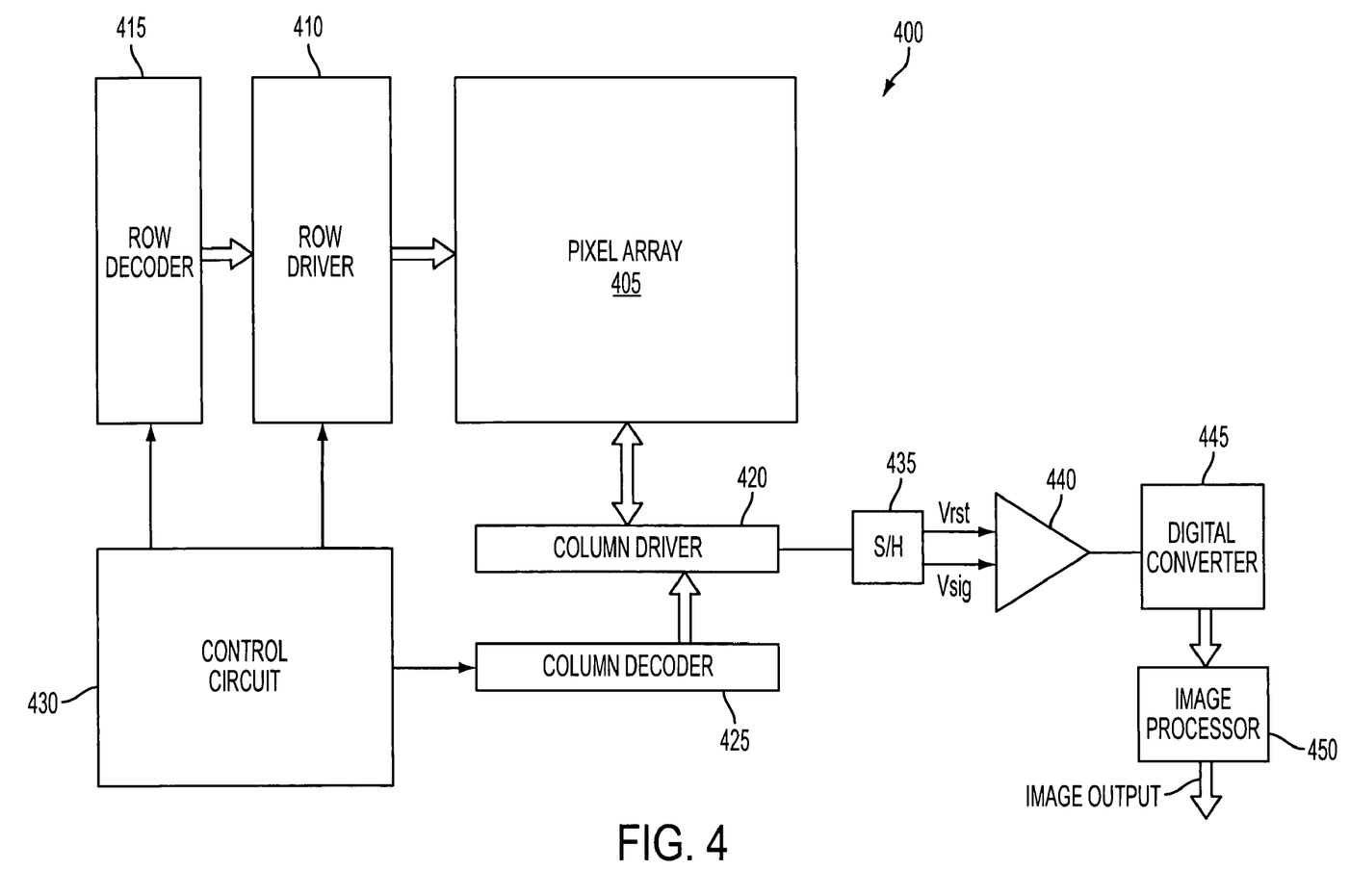
FIG. 4 is a block diagram of an imager device, including the anti-eclipse circuit of the invention.

FIG. 4 illustrates a block diagram of a CMOS imager device 400 having a pixel array 405 with each pixel cell being constructed as described above, or as other known pixel cell circuits. Pixel array 405 comprises a plurality of pixels arranged in a predetermined number of columns and rows (not shown). The pixels of each row in array 405 are all turned on at the same time by a row select line, and the pixels of each column are selectively output by respective column select lines. A plurality of row and column lines are provided for the entire array 405. The row lines are selectively activated in sequence by a row driver 410 in response to row address decoder 415. The column select lines are selectively activated in sequence for each row activation by a column driver 420 in response to column address decoder 425. Thus, a row and column address is provided for each pixel.

The CMOS imager 400 is operated by a control circuit 430, which controls address decoders 415, 425 for selecting the appropriate row and column lines for pixel readout. Control circuit 430 also controls the row and column driver circuitry 410, 420 so that they apply driving voltages to the drive transistors of the selected row and column lines. The pixel output signals typically include a pixel reset signal Vrst read out of the storage region after it is reset by the reset transistor and a pixel image signal Vsig, which is read out of the storage region after photo-generated charges are transferred to the region. The Vrst and Vsig signals are sampled by a sample and hold circuit 435 and are subtracted by a differential amplifier 440, to produce a differential signal Vrst−Vsig for each pixel. Vrst−Vsig represents the amount of light impinging on the pixels. This difference signal is digitized by an analog-to-digital converter 445. The digitized pixel signals are fed to an image processor 450 to form a digital image output. The digitizing and image processing can be located on or off the imager chip. In some arrangements the differential signal Vrst−Vsig can be amplified as a differential signal and directly digitized by a differential analog to digital converter.

Figure 5:
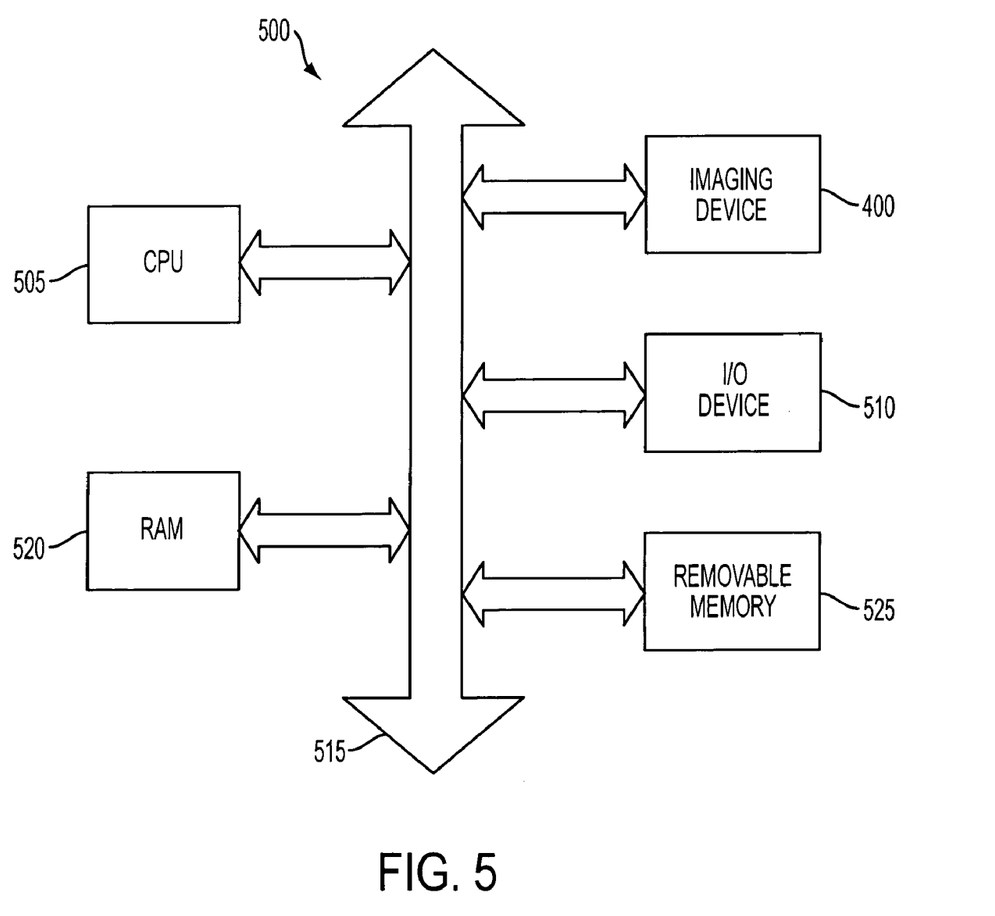
FIG. 5 illustrates a processing system incorporating the anti-eclipse circuit of the invention.

FIG. 5 illustrates a processor-based system 500, for example a camera system, which generally comprises a central processing unit (CPU) 505, such as a microprocessor, that communicates with an input/output (I/O) device 510 over a bus 515. Imager 400 also communicates with the CPU 505 over bus 515. The processor-based system 500 also includes random access memory (RAM) 520, and can include removable memory 525, such as flash memory, which also communicate with CPU 505 over the bus 515. Imager 400 may be combined with a processor, such as a CPU, digital signal processor, or microprocessor, with or without memory storage on a single integrated circuit or on a different chip than the processor.

It should be appreciated that other embodiments of the invention include a method of manufacturing the device 300 of the invention (illustrated in FIG. 3). For example, in one exemplary embodiment, a method of fabricating an anti-eclipse circuit is provided. The method comprises forming an output line for receiving a reset output signal from a pixel; and forming a circuit coupled to said output line for detecting when a pixel reset voltage at a pixel output is below a predetermined level and in response for increasing a reset voltage at said pixel output to a value above said predetermined level, wherein said detecting and increasing circuit comprises: forming a charge amplifier circuit for receiving said reset output signal at said output line; and forming a voltage generating circuit coupled to said output line responsive to the output of said charge amplifier circuit.

Various embodiments of the invention have been illustrated using a photodiode as the charge conversion device, and in the environment of a four transistor pixel. It should be appreciated that, other types of photosensors may be used to generate image charge. The invention may also be used in a readout circuit for a CCD (charge coupled device) array. Accordingly, it is not intended that the present invention be strictly limited to the above-described and illustrated embodiments. Any modifications of the present invention as described in the embodiments herein that falls within the spirit and scope of the following claims should be considered part of the present invention.

What is claimed as new and desired to be protected by Letters Patent of the United States is:

1. An anti-eclipse circuit for an imager, said circuit comprising:
    an output line for receiving a reset output signal from a pixel; and
    a circuit coupled to said output line for detecting when a pixel reset voltage at a pixel output is below a predetermined level and in response for increasing a reset voltage at said pixel output to a value above said predetermined level, wherein said detecting and increasing circuit comprises:
        a charge amplifier circuit for receiving said reset output signal at said output line; and
        a voltage generating circuit coupled to said output line responsive to the output of said charge amplifier circuits
        wherein said charge amplifier circuit comprises:
            a first transistor connected to a first current source and a ground potential;
            a first capacitor coupled between said pixel output and a gate of said first transistor; and
            a second capacitor coupled between said gate of said first transistor and said first current source.

2. The anti-eclipse circuit of claim 1, wherein said voltage generating circuit comprises:
    a second transistor for setting the reset voltage of said pixel to a reference voltage when an eclipse condition is detected by said charge amplifier; and
    a third transistor for determining said reference voltage.

3. An imager comprising:
    an array of pixel circuits, arranged in rows and columns, each pixel circuit in a column having an output coupled to a common column line; and
    the anti-eclipse circuit of claim 1,
    wherein said output line is coupled to said common column line.

4. The imager of claim 3, wherein said voltage generating circuit comprises:
    a second transistor for setting the reset voltage of said pixel to a reference voltage when an eclipse condition is detected by said charge amplifier; and
    a third transistor for determining said reference voltage.

5. A processing system comprising:
    a processor; and
    the imager of claim 3, said imager being electronically coupled to said processor.

6. The processing system of claim 5, wherein said voltage generating circuit comprises:
   a second transistor for setting the reset voltage of said pixel to a reference voltage when an eclipse condition is detected by said charge amplifier; and
   a third transistor for determining said reference voltage.

7. The processing system of claim 5, wherein said charge amplifier circuit further comprises:
   a third capacitor coupled between a gate of said second transistor and said first current source;
   a first switch for discharging said third capacitor; and
   a second switch for discharging said charge amplifier.

8. The imager of claim 3, wherein said charge amplifier circuit further comprises:
   a third capacitor coupled between a gate of said second transistor and said first current source;
   a first switch for discharging said third capacitor; and
   a second switch for discharging said charge amplifier.

9. The anti-eclipse circuit of claim 1, wherein said charge amplifier circuit further comprises:
   a third capacitor coupled between a gate of said second transistor and said first current source;
   a first switch for discharging said third capacitor; and
   a second switch for discharging said charge amplifier.

10. A method of operating an anti-eclipse circuit comprising the steps of:
   receiving a reset output signal from a pixel; and
   detecting when a voltage of said reset output signal is below a predetermined level; and
   increasing said reset output signal voltage to a value above said predetermined level, wherein said step of increasing comprises:
   amplifying a charge based on said reset output signal, and
   generating a voltage in response to the output of said amplifying step, wherein said amplifying step comprises operating a charge amplifier circuit comprising:
      a first transistor connected to a first current source and a around potential;
      a first capacitor coupled between said pixel output and a gate of said first transistor; and
      a second capacitor coupled between said gate of said first transistor and said first current source.

11. A method of operating an anti-eclipse circuit comprising the steps of:
   closing a first switch and a second switch in a charge amplifier circuit;
   turning off a first transistor in the charge amplifier circuit;
   opening said first and second switches;
   turning off a second transistor in a voltage generating circuit connected to an output of the charge amplifier circuit;
   sensing a voltage drop of a pixel output;
   turning on said second transistor; and
   setting said pixel output at a reference voltage.

12. The method of claim 11, wherein said reference voltage is provided by a third transistor.

13. The method of claim 11, further comprising setting the reset voltage of said pixel to a reference voltage with said second transistor when an eclipse condition is detected.

* * * * *

UNITED STATES PATENT AND TRADEMARK OFFICE
CERTIFICATE OF CORRECTION

| | |
|---|---|
| PATENT NO. | : 7,659,928 B2 |
| APPLICATION NO. | : 11/110874 |
| DATED | : February 9, 2010 |
| INVENTOR(S) | : Hai Yan |

Page 1 of 1

It is certified that error appears in the above-identified patent and that said Letters Patent is hereby corrected as shown below:

In the Specification:

Column 2, line 35, "the floating diffusion node and can causes the pixel 100" should read --the floating diffusion node and can cause the pixel 100--.

Column 4, line 10, "the can also be formed as parasitic capacitances" should read --they can also be formed as parasitic capacitances--.

Column 6, lines 10-12, "It should be appreciated that, other types of photosensors may be used to generate image charge" should read --It should be appreciated that other types of photosensors may be used to generate image charge--.

In the Claims:

Claim 1, lines 35-36, "said charge amplifier circuits" should read --said charge amplifier circuit--.

Claim 10, line 8, "a around potential" should read --a ground potential--.

Signed and Sealed this

Twenty-ninth Day of June, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,659,928 B2 | Page 1 of 1 |
| APPLICATION NO. | : 11/110874 | |
| DATED | : February 9, 2010 | |
| INVENTOR(S) | : Hai Yan | |

It is certified that error appears in the above-identified patent and that said Letters Patent is hereby corrected as shown below:

In the Specification:

Column 2, line 35, "the floating diffusion node and can causes the pixel 100" should read --the floating diffusion node and can cause the pixel 100--.

Column 4, line 10, "the can also be formed as parasitic capacitances" should read --they can also be formed as parasitic capacitances--.

Column 6, lines 10-12, "It should be appreciated that, other types of photosensors may be used to generate image charge" should read --It should be appreciated that other types of photosensors may be used to generate image charge--.

In the Claims:

Column 6, Claim 1, lines 35-36, "said charge amplifier circuits" should read --said charge amplifier circuit--.

Column 8, Claim 10, line 8, "a around potential" should read --a ground potential--.

This certificate supersedes the Certificate of Correction issued June 29, 2010.

Signed and Sealed this

Twentieth Day of July, 2010

David J. Kappos
*Director of the United States Patent and Trademark Office*